(12) United States Patent
Burge et al.

(10) Patent No.: US 11,686,580 B2
(45) Date of Patent: *Jun. 27, 2023

(54) LEVEL WITH ROTATING VIAL AND LOCKING ASSEMBLY

(71) Applicant: Milwaukee Electric Tool Corporation, Brookfield, WI (US)

(72) Inventors: Joseph William Burge, Milwaukee, WI (US); Bryant Deakins, Kansasville, WI (US); Michael Wyatt, Waukesha, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 86 days.

This patent is subject to a terminal disclaimer.

(21) Appl. No.: 17/369,198

(22) Filed: Jul. 7, 2021

(65) Prior Publication Data

US 2021/0333101 A1 Oct. 28, 2021

Related U.S. Application Data

(63) Continuation of application No. 16/700,623, filed on Dec. 2, 2019, now Pat. No. 11,085,764, which is a continuation of application No. 15/365,508, filed on Nov. 30, 2016, now Pat. No. 10,527,415, which is a
(Continued)

(51) Int. Cl.
*G01C 9/28* (2006.01)
*G01C 9/34* (2006.01)

(52) U.S. Cl.
CPC .................. *G01C 9/28* (2013.01); *G01C 9/34* (2013.01)

(58) Field of Classification Search
None
See application file for complete search history.

(56) References Cited

U.S. PATENT DOCUMENTS

| 826,182 A | 7/1906 | Morrison |
| 1,012,668 A | 12/1911 | Lofberg |
| 1,133,936 A | 3/1915 | Coughlin |

(Continued)

FOREIGN PATENT DOCUMENTS

| CN | 2242441 Y | 12/1996 |
| CN | 2254542 Y | 5/1997 |

(Continued)

OTHER PUBLICATIONS

International Search Report and Written Opinion for PCT/US2016/064175, dated Mar. 15, 2017, 16 pages.

*Primary Examiner* — Christopher W Fulton
(74) *Attorney, Agent, or Firm* — Reinhart Boerner Van Deuren s.c.

(57) ABSTRACT

A level including a rotating level vial is provided. The level includes a locking mechanism that utilizes an actuator that engages a brake to lock the rotating vial into the desired position. The locking mechanism may include a spring element that is compressed by the actuator during locking, and the spring element in turn pushes against the brake facilitating control of the normal force that the brake applies to the vial surround of the rotating vial. The rotating level vial may engage the level body such that the rotating level vial is permitted to rotate 360 degrees in both the clockwise and counter clockwise directions.

20 Claims, 7 Drawing Sheets

Related U.S. Application Data continuation of application No. PCT/US2016/064175, filed on Nov. 30, 2016.

(60) Provisional application No. 62/265,545, filed on Dec. 10, 2015.

(56) References Cited

U.S. PATENT DOCUMENTS

| | | | |
|---|---|---|---|
| 1,735,413 | A | 11/1929 | Rudolff |
| 1,830,009 | A | 11/1931 | Walters |
| 2,180,509 | A | 11/1939 | Dickson |
| 2,527,961 | A | 10/1950 | Rantz |
| 3,894,342 | A | 7/1975 | Goode |
| 3,947,970 | A | 4/1976 | Lesure |
| 4,182,046 | A | 1/1980 | Ludlow |
| 4,335,524 | A | 6/1982 | Schimming |
| 4,481,720 | A | 11/1984 | Sury |
| 4,525,933 | A | 7/1985 | Patterson |
| 4,531,301 | A | 7/1985 | Tau |
| 4,774,767 | A | 10/1988 | Scheyer |
| 4,955,141 | A | 9/1990 | Welch |
| 4,999,921 | A | 3/1991 | Bird et al. |
| 5,020,232 | A | 7/1991 | Whiteford |
| 5,421,094 | A | 7/1995 | McCord et al. |
| 5,438,761 | A | 8/1995 | Krumszyn et al. |
| 5,546,670 | A | 8/1996 | Chiang |
| 5,713,135 | A | 2/1998 | Acopulos |
| 5,842,282 | A | 12/1998 | Ting |
| 5,992,033 | A | 11/1999 | Scarborough |
| 6,012,229 | A | 1/2000 | Hsiao |
| 6,029,360 | A | 2/2000 | Koch |
| 6,148,530 | A | 11/2000 | Jacoff et al. |
| 6,176,020 | B1 * | 1/2001 | Scarborough ............ G01C 9/28 33/379 |
| 6,209,371 | B1 | 4/2001 | Guinn |
| 6,360,446 | B1 | 3/2002 | Bijawat et al. |
| 6,477,781 | B1 | 11/2002 | Blatt |
| 6,560,885 | B1 | 5/2003 | Cosentino |
| 6,568,095 | B2 | 5/2003 | Snyder |
| 6,782,628 | B2 | 8/2004 | Liao |
| 6,834,435 | B2 | 12/2004 | Turner |
| 6,918,187 | B2 | 7/2005 | Schaefer |
| 7,152,335 | B2 | 12/2006 | Nichols |
| 7,243,435 | B2 | 7/2007 | Morrissey et al. |
| 7,363,719 | B2 | 4/2008 | Levinson |
| 7,472,487 | B2 | 1/2009 | Tran et al. |
| 7,555,842 | B1 | 7/2009 | Asay |
| 7,600,324 | B2 | 10/2009 | Maruyama |
| 8,011,109 | B2 | 9/2011 | Christianson et al. |
| 9,360,315 | B2 * | 6/2016 | Silberberg ............ G01C 9/28 |
| 9,885,571 | B2 * | 2/2018 | Hoppe ............ G01C 9/34 |
| 10,422,638 | B2 * | 9/2019 | Burge ............ G01C 9/02 |
| 10,527,415 | B2 | 1/2020 | Burge et al. |
| 11,085,764 | B2 * | 8/2021 | Burge ............ G01C 9/34 |
| 2005/0252016 | A1 | 11/2005 | Helda et al. |
| 2010/0223795 | A1 | 9/2010 | Chisholm et al. |
| 2015/0308820 | A1 | 10/2015 | Silberberg |

FOREIGN PATENT DOCUMENTS

| | | | |
|---|---|---|---|
| CN | 2332995 | Y | 8/1999 |
| CN | 2381998 | Y | 6/2000 |
| CN | 2557921 | Y | 6/2003 |
| CN | 2577244 | Y | 10/2003 |
| CN | 2577247 | Y | 10/2003 |
| CN | 2639849 | Y | 9/2004 |
| CN | 2800227 | Y | 7/2006 |
| CN | 200950060 | Y | 9/2007 |
| CN | 201210053 | Y | 3/2009 |
| CN | 201255637 | Y | 6/2009 |
| CN | 201392198 | Y | 1/2010 |
| CN | 101711344 | A * | 5/2010 ............ G01C 9/28 |
| CN | 201463885 | U | 5/2010 |
| CN | 203190970 | U | 9/2013 |
| CN | 103727924 | A | 4/2014 |
| CN | 104121890 | A | 10/2014 |
| CN | 204027564 | U | 12/2014 |
| CN | 204085420 | U | 1/2015 |
| CN | 204313833 | U | 5/2015 |
| CN | 204479071 | U | 7/2015 |
| EP | 1122512 | B1 | 11/2003 |
| KR | 20-2008-0004099 | | 9/2008 |
| KR | 20-2015-0003257 | | 8/2015 |
| TW | I233982 | | 6/2005 |
| TW | M506282 | | 8/2015 |
| WO | WO2013024275 | | 2/2013 |

* cited by examiner

LEVEL WITH ROTATING VIAL AND LOCKING ASSEMBLY

CROSS-REFERENCE TO RELATED PATENT APPLICATION

The present application is a continuation of U.S. application Ser. No. 16/700,623, now U.S. Pat. No. 11,085,764, filed Dec. 2, 2019, which is a continuation of U.S. application Ser. No. 15/365,508, now U.S. Pat. No. 10,527,415, filed Nov. 30, 2016, which is a continuation of International Application No. PCT/US2016/064175, filed Nov. 30, 2016, which claims the benefit of and priority to U.S. Provisional Application No. 62/265,545, filed on Dec. 10, 2015, which are incorporated herein by reference in their entireties.

BACKGROUND OF THE INVENTION

The present invention relates generally to the field of tools. The present invention relates specifically to a tool, such as a level, with a rotating vial and a locking assembly configured to temporarily, reversibly and/or selectably fix the vial in place at a custom angle as selected by a user. Levels are used to determine the levelness of a structure, surface or workpiece. In use the level is placed on or in contact with a surface to be measured, and the user views the location of a bubble within a vial relative to markings that indicate the levelness of the structure, surface or workpiece.

SUMMARY OF THE INVENTION

One embodiment of the disclosure relates to a tool, specifically a level. The level includes a level body defining a base surface configured to engage a workpiece and a rotating level vial located within the level body. The rotating level vial has an interior chamber containing a mineral spirit liquid and a bubble. The level includes a vial support surrounding and supporting the rotating level vial, and the vial support is located within an opening formed in the level body. The vial support is rotatable within the opening such that the rotating level vial may be oriented at a plurality of angular positions relative to the base surface. The level includes a locking system including a threaded channel, a threaded screw engaging the threaded channel and a brake component having a first surface facing the vial support and a second surface facing the threaded screw. The threaded screw is moveable within the threaded channel between a locked position and an unlocked position. In the locked position, the threaded screw engages the brake component such that the first surface of the brake component engages the vial support with a force sufficient to restrain rotation of the vial support and to hold the rotating level vial and vial support in a selected angular position relative to the base surface. In the unlocked position, the vial support and rotating level vial are permitted to rotate within the opening.

Another embodiment of the disclosure relates to a level. The level includes a level body defining a base surface configured to engage a workpiece and a level vial located within the level body. The level includes a vial support surrounding and supporting the level vial, and the vial support is located within an opening formed in the level body. The vial support is rotatable within the opening such that the level vial may be oriented to a plurality of angular positions relative to the base surface. The level includes a locking system. The locking system includes an actuator and a brake component having a first surface facing the vial support and a second surface facing the actuator. The locking system includes a spring element located between the actuator and the brake such that the actuator compresses the spring element when the actuator is moved from an unlocked position to a locked position in which the actuator causes the first surface of the brake component to engage the vial support with a force sufficient to restrain rotation of the vial support.

Another embodiment of the disclosure relates to a leveling device. The leveling device includes a level body defining a base surface configured to engage a workpiece and a level vial located within the level body. The leveling device includes a vial support surrounding and supporting the level vial. The vial support is located within an opening formed in the level body, and the vial support is rotatable within the opening 360 degrees in both the clockwise and counterclockwise directions such that the level vial may be oriented a plurality of angular positions relative to the base surface. The level includes a locking system configured to lock the vial support in a selected angular position.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Referring generally to the figures, various embodiments of a level are shown. In general, the levels discussed herein include one or more level vial and a level base. As will be generally understood, the base surface of the level is placed on a workpiece (e.g., a structure, surface, etc.) in order for the user of the level to determine the levelness of the workpiece surface. The level embodiments discussed herein include one or more rotating vials and a locking mechanism used to temporarily, reversibly and/or selectably fix the rotating vial at a custom angle relative to the level base as may be selected by the level user.

Traditionally, levels include one or more vials preset at specific angles relative to the level base, such as 0, 90, and/or 45 degrees. However, these standard, fixed and preset angles may be difficult to use during some types of work where repeated leveling of surfaces at nonstandard angles is common. The rotating vial of the present disclosure allows the user to select the angle of the level vial relative to the level base. Thus, the user can utilize a single level which can be adapted by the user to a task requiring leveling of surfaces located at a non-standard angle (e.g., measure levelness of surfaces at non-standard angles).

However, a challenge with a rotating level vials is how to secure the vial in place at the angle selected by the user. The level embodiments discussed herein include a locking assembly that Applicant has identified as providing superior locking performance (at least compared to some conventional level designs). In particular, the locking assembly discussed herein reversibly locks the rotating vial in place in a manner that reliably holds the vial in the desired rotational position while reducing/eliminating the chance that the rotating vial inadvertently rotates (e.g., rotates in a pocket, in a tool belt, while being carried, while being used, etc.). As discussed below, in various embodiments, the locking mechanism discussed herein securely fixes the rotating vial within the housing of the level until the locking mechanism is disengaged intentionally by the user. In addition, the rotating vial design discussed herein allows the level vial to be rotated 360 degrees in both the clockwise and counterclockwise directions.

Figure 1:
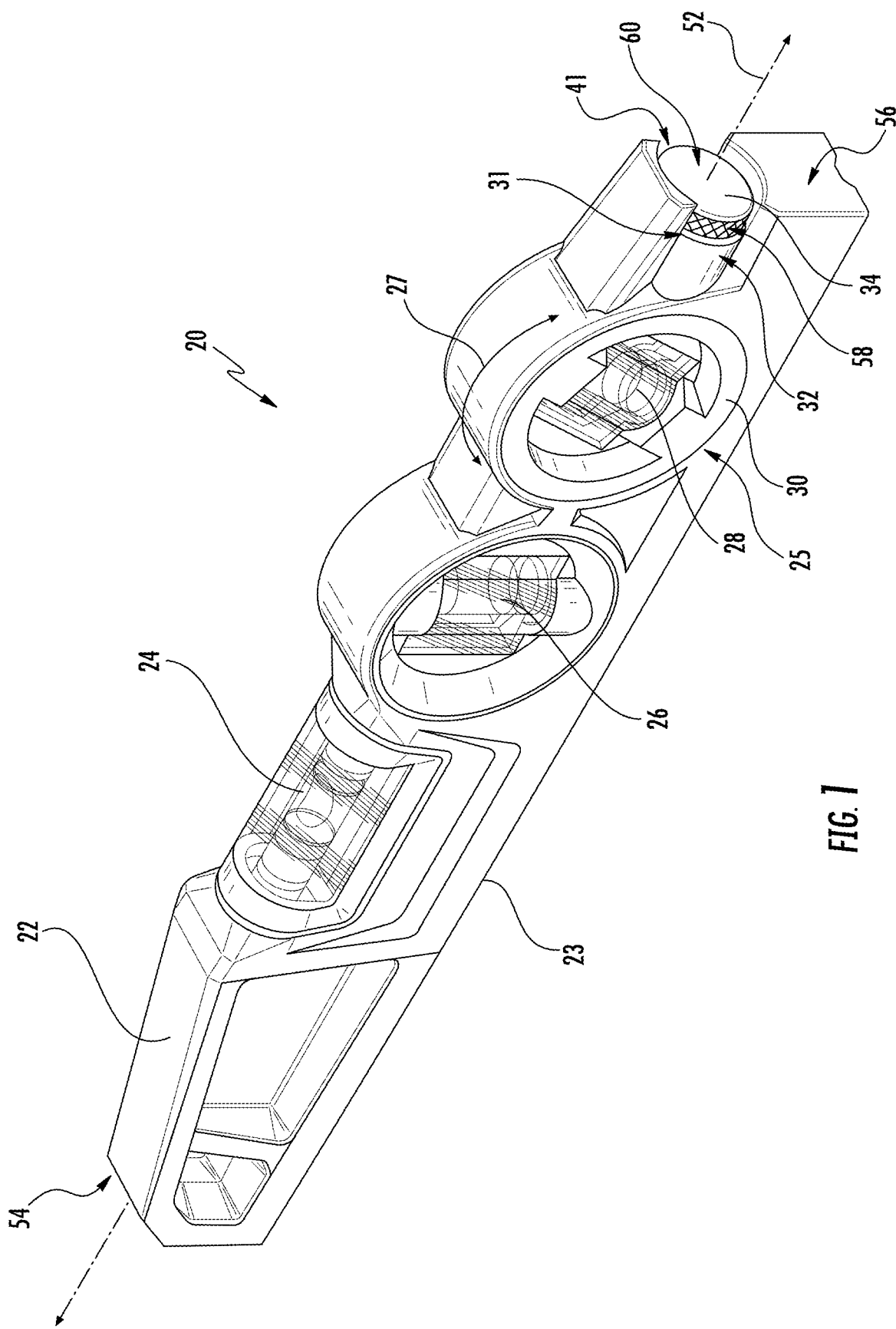
FIG. 1 is a perspective view from above of a level according to an exemplary embodiment.

Referring to FIG. 1, a level with a rotating vial, such as level 20, is shown according to an exemplary embodiment. Level 20 includes a level body, shown as housing 22, and a base surface, shown as level base 23. A first vial 24 is set in housing 22 such that it is parallel or at 0 degrees relative to level base 23. A second vial 26 is set in housing 22 such that it is perpendicular to or at 90 degrees relative to level base 23.

Level 20 includes a rotating level vial assembly 25 and includes a vial support, shown as vial surround 30, and a level vial 28. Vial surround 30 is set in housing 22 such that it may rotate freely within housing 22. Vial 28 is fixed in vial surround 30 such that it may be rotated along with vial surround 30 to form a variety of selected angles relative to level base 23. As shown, vial 28 is rigidly fixed in position relative to vial surround 30 such that rotation of vial surround 30 cause rotation of vial 28. In general, vials 24, 26 and 28 are hollow vials (e.g., glass or plastic vials) having an internal chamber holding a liquid, such as a mineral spirit, and including a bubble which moves providing the leveling indication.

In one embodiment, vial surround 30 is rotatable 360 degrees within housing 22. In some such embodiments, vial surround 30 is rotatable continuously such that vial surround 30 and vial 28 may be positioned at an angular position selected by the user. In various embodiments, vial surround 30 and vial 28 are rotatable in both the clockwise and counter clockwise directions as shown by arrow 27. In other embodiments, vial surround 30 only rotates a limited number of degrees within housing 22 (e.g., rotatable less than 360 degrees, less 270 degrees, less than or equal to 180 degrees, etc.).

Figure 2:
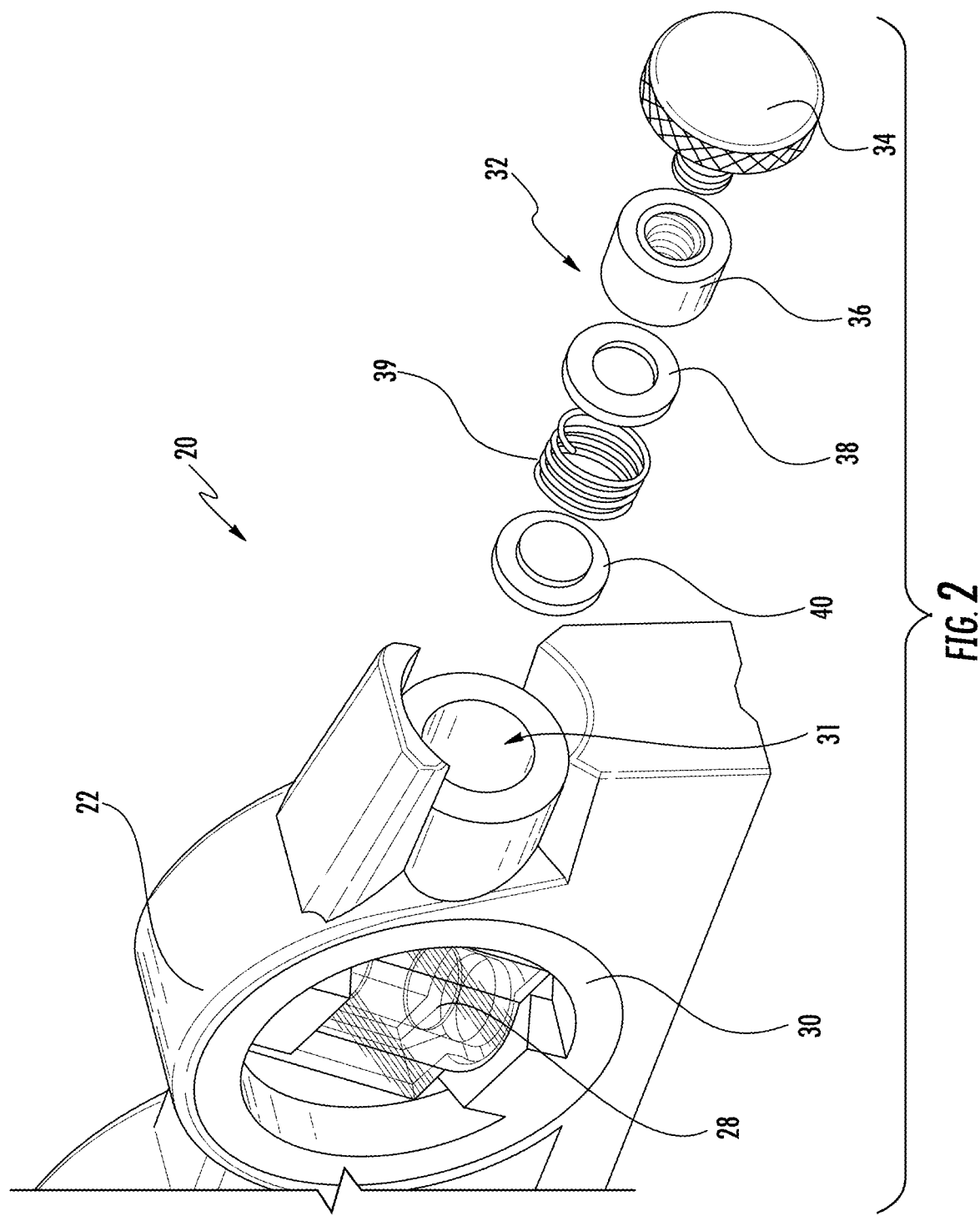
FIG. 2 is an exploded perspective view showing a locking assembly for a rotating level vial according to an exemplary embodiment.

Referring to FIGS. 1 and 2, a locking system or assembly, shown as locking mechanism 32, is set in a cavity 31 of housing 22. Locking mechanism 32 includes an actuator, shown as adjustable fastener 34, that applies a variable coupling force on vial surround 30 to reversibly and selectably fix vial surround 30 at a desired angle relative to level base 23. Fastener 34 may be disengaged such that low or zero coupling force is applied to vial surround 30 allowing vial surround 30 to rotate within housing 22. Various embodiments include various combinations of preset and rotatable vials, including embodiments with one or more rotating vial, only a single rotatable vial and no fixed vials and embodiments with multiple rotatable vials having separate locking mechanisms and no fixed vials.

Referring to FIG. 2, an exploded view of an embodiment of locking mechanism 32 is shown removed from cavity 31. Locking mechanism 32 includes adjustable fastener 34, an insert 36, a retainer 38, and pad 40. Insert 36 is fixed at the entrance of cavity 31 and configured to receive fastener 34. In one embodiment, an adhesive is used to fix insert 36 within cavity 31, and in another embodiment, insert 36 is friction fit within cavity 31. Retainer 38 and a brake, shown as pad 40, are placed within cavity 31 behind insert 36 and sized such that they are movable in the longitudinal direction within cavity 31.

In this arrangement, pad 40 has a first or inner surface facing vial surround 30 and a second or outer surface facing adjustable fastener 34. In one embodiment a biasing element or spring element, shown as spring 39, is located between retainer 38 and pad 40. In one embodiment, spring 39 is a coil spring, and in another embodiment spring 39 is a washer spring. In various embodiments, the locking assembly may include a wide variety of biasing elements, such as a helical coil spring, a leaf spring, v-spring, Belleville spring, various types of elastic materials including rubbers, foams, etc.

Figure 3:
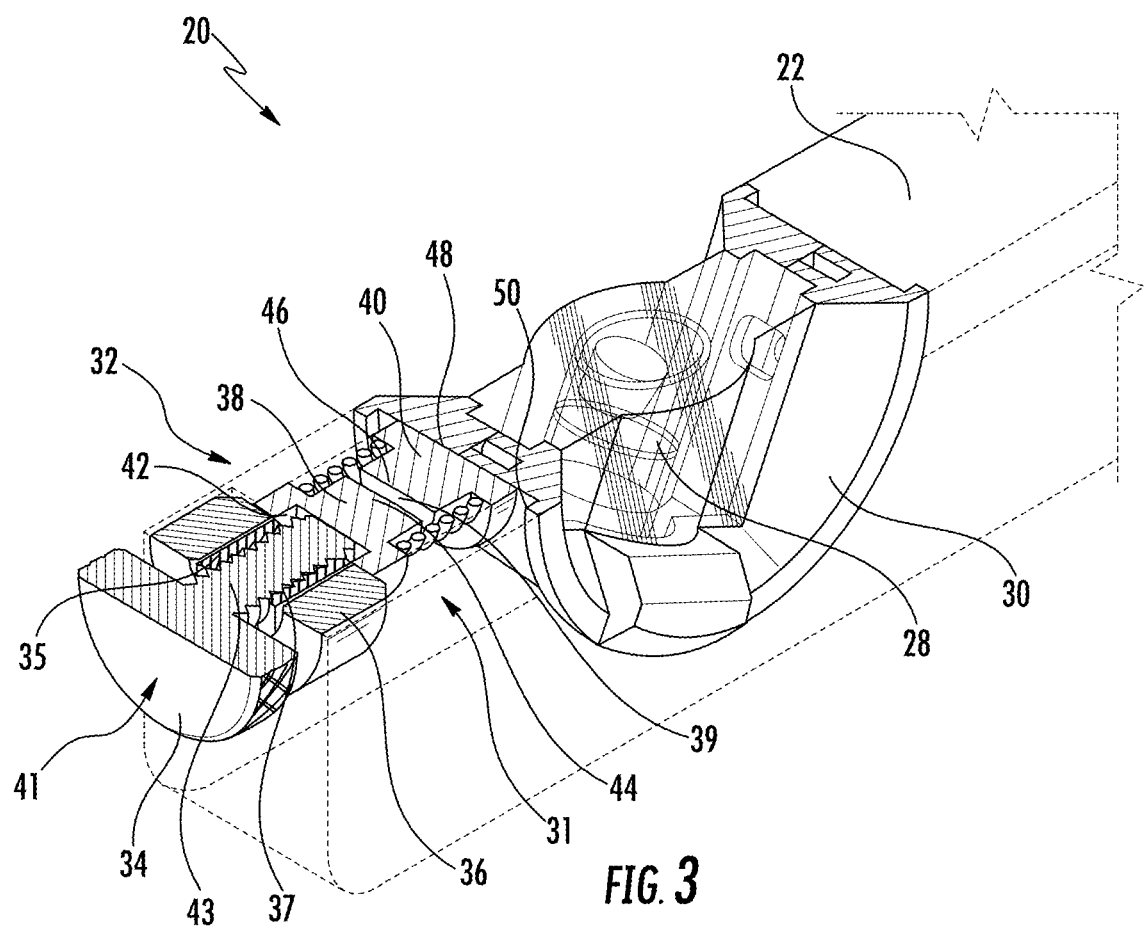
FIG. 3 is a perspective cross-sectional view of the locking assembly of FIG. 2 according to an exemplary embodiment.

Referring now to FIG. 3, a perspective cross-sectional view of an embodiment of the locking mechanism 32 and vial surround 30 within level 20 is shown. In this embodiment, fastener 34 is a screw having a head 41 and body or shaft 43, and the body has threads 35. Insert 36 has cooperating threads 37 that engage threads 35 such that fastener 34 may be advanced into and out of cavity 31 by rotating fastener 34. In this embodiment, insert 36 defines a threaded internal channel within which fastener 34 is received, but in other embodiments, threads 37 may be formed directly in the material of level body 22.

In general, and as will be explained in more detail below, fastener 34 is moveable within insert 36 between a locked position and an unlocked position. In general, in the locked position, the inner surface of pad 40 is moved to engage the outer surface of vial surround 30 with a force sufficient to restrain rotation of vial surround 30 and to hold level vial 28 and vial surround 30 in a selected angular position relative to the base 23. In general, in the unlocked position, vial surround 30 and level vial 28 are permitted to rotate within level body 22.

The body of fastener 34 is longer than insert 36 such that a portion of the body of fastener 34 extends into cavity 31 beyond the inner end of insert 36 when fastener 34 is partially or fully advanced within cavity 31. A depression 42 is included on the top of retainer 38. Depression 42 is configured to receive the portion of fastener 34 that extends beyond the end of insert 36. In an alternative embodiment, the depression 42 is omitted, and retainer 38 is flat across the surface facing fastener 34.

As shown in FIG. 3, the inner end of retainer 38 includes a reduced diameter post 44, and the outer end of pad 40 facing retainer 38 includes a reduced post 46. As shown in FIG. 3, posts 44 and 46 extend into the central cavity of spring 39, and in this manner posts 44 help retain spring 39 in the appropriate position during locking and unlocking of locking mechanism 32.

In general, the compression state of spring 39 corresponds to the advancement of fastener 34 within cavity 31. When fastener 34 is fully removed from cavity 31, spring 39 is in its uncompressed state, and when fastener 34 is fully advanced within cavity 31 spring 39 is in its fully compressed state (see FIG. 4). In other embodiments, fastener 34 need not be fully removed from cavity 31 to induce the uncompressed static state in spring 39. In some embodiments, fastener 34 is sized such that, upon retraction, no portion of fastener 34 extends into cavity 31 beyond the inner end of insert 36 resulting in the uncompressed state of spring 39.

In one embodiment, one face of retainer 38 is in contact with the opposing face of insert 36 when spring 39 is in its uncompressed static state. In one embodiment, pad 40 includes a face 48 in contact with a surface 50 of vial surround 30 when spring 39 is in both the uncompressed state and fully compressed state. The constant contact of pad 40 with surface 50 provided by spring 39 ensures a minimum amount of friction between the surface 50 and pad 40 regardless of the position of fastener 34. In one embodiment, the minimum friction is such that vial surround 30 will not freely rotate, but can be moved by applying a slight force, such as a gentle twist. Disabling free rotation of vial surround 30 when the spring 39 is in its uncompressed static state allows the vial 28 to remain set but not locked with respect to level base 23 as the locking mechanism 32 is engaged.

To allow the vial to be rotated and positioned at the desired angular position by the user, fastener 34 is advanced out of cavity 31, bringing spring 39 to its uncompressed state, which in turn decreases the normal force applied by pad 40 onto the outer surface of vial surround 30. In one embodiment, when fastener 34 is fully withdrawn, no portion extends into cavity 31 beyond the interior end of insert 36. In the unlocked state, no normal force or a relatively small normal force is applied to vial surround 30 by pad 40, which allows vial surround 30 to rotate within level body 22 to the desired angle. In one embodiment, vial surround 30 includes an indicator that corresponds to markings on housing 22 that indicate the current angle of vial 28.

To lock vial surround 30 in place, fastener 34 is advanced into cavity 31. As fastener 34 advances it contacts depression 42 of retainer 38. The further advancement of fastener 34 advances retainer 38 further into cavity 31. The advancement of retainer 38 engages the first end of spring 39 and begins to compress the spring 39. As spring 39 is compressed, the second end of spring 39 pushes pad 40 against surface 50 with a greater force. This action increases the amount of friction between surface 50 and face 48. This process will continue until fastener 34 is fully within cavity 31 and/or the spring 39 is in its fully compressed state, at which point vial surround 30 will be fully locked in place such that rotational movement of vial surround 30 will be prevented or resisted.

In such embodiments, the normal force between surface 50 and vial surround 30 is related to the degree to which fastener 34 is threaded into insert 36 and to the amount of compression of spring 39, and in specific embodiments, the normal force between surface 50 and vial surround 30 increases as the degree of spring compression increases and/or as fastener 34 is threaded further into insert 36. Thus, in such arrangements, utilizing a biasing element, such as spring 39, as part of locking mechanism 32 allows locking mechanism 32 to provide varying levels of normal force onto vial surround from a low or zero amount of normal force to a high amount of normal force when spring 39 is fully compressed.

Figure 4:
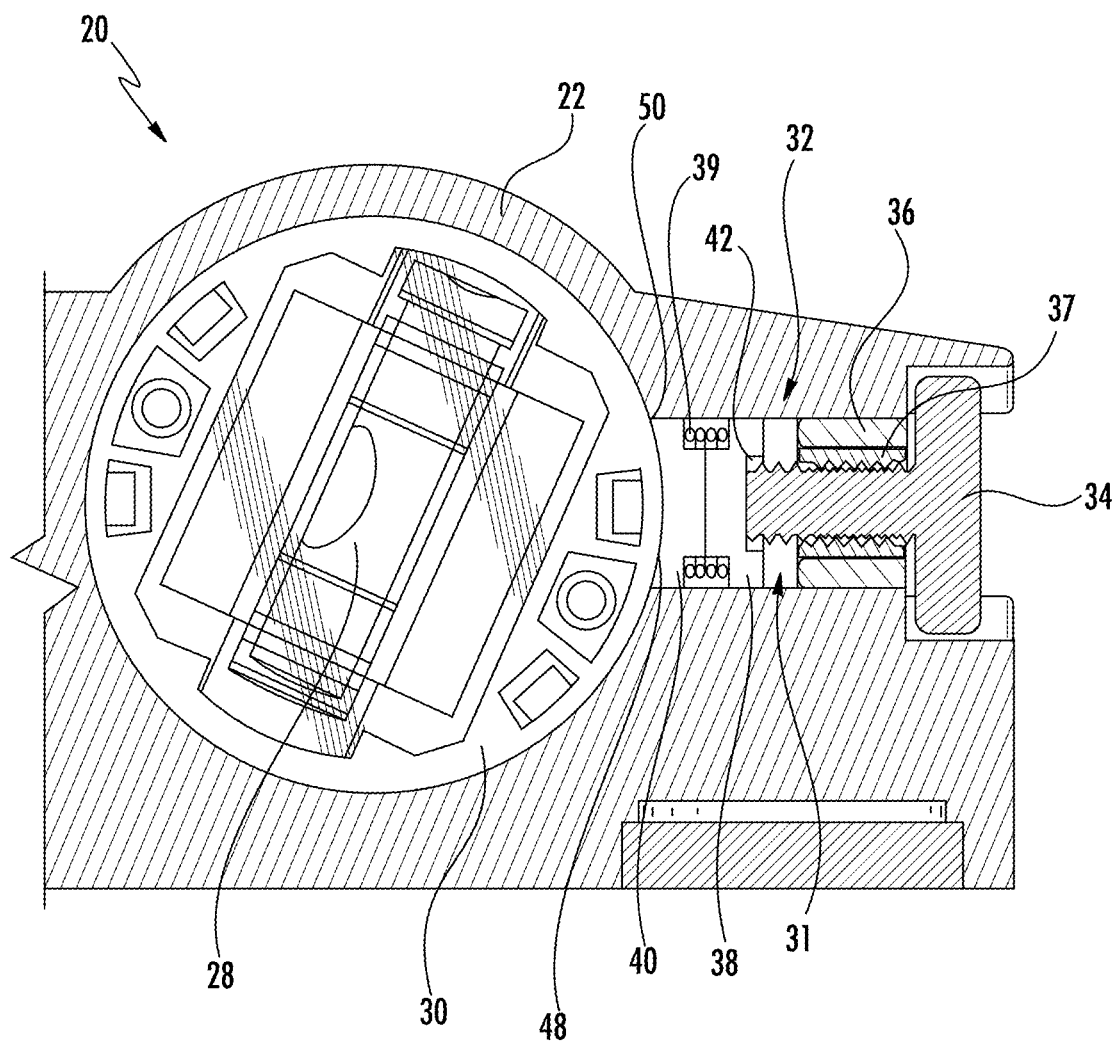
FIG. 4 is a side cross-sectional view of the locking assembly of FIG. 2 according to an exemplary embodiment.

Referring to FIG. 4 the locking mechanism 32 is shown in its fully locked or engaged position with the top of pad 40 contacting the bottom of retainer 38. In this embodiment spring 39 (labeled in FIG. 3) is fully compressed and located between pad 40 and retainer 38 and is shown surrounding first and second posts 44 and 46. In alternative embodiments, the biasing element may fill the space between pad 40 and retainer 38 thus preventing contact of the top of pad 40 and bottom of retainer 38. In one embodiment, the portion of cavity 31 is sealed off by use of standard O-rings around the exterior surfaces of pad 40 and retainer 38.

In another embodiment, a first slot is included on the end of retainer 38 facing pad 40 that is configured to receive a first end of a biasing element, such as spring 39. In addition, a second slot is included on the end of pad 40 facing retainer 38 that is configured to receive a second end of the biasing element, such as spring 39. In such embodiments, spring 39 is located between retainer 38 and pad 40 within an area defined by the opposing slots of retainer 38 and pad 40.

In various embodiments, Applicant has developed a rotating level and locking mechanism that is positioned relative to level body 22 and/or base 23 in a manner that improves use/access to locking mechanism 32 and that may facilitate assembly of locking mechanism 32. In particular, Applicant believes that the arrangement discussed herein provides a locking mechanism having low complexity that also provides a tight hold on vial surround 30 when in the locked position.

Referring back to FIG. 1, level body 22 defines a longitudinal axis 52, and vial surround 30 is positioned so that its axis of rotation is substantially perpendicular (e.g., within 1 degree of perpendicular) to longitudinal axis 52 and substantially parallel (e.g., within 1 degree of parallel) to the plane defined by base surface 23. In addition, as can be seen in FIGS. 1 and 2, a longitudinal axis defined by the threaded channel of insert 36 is substantially parallel (e.g., within 1 degree of parallel) to longitudinal axis 52.

Still referring to FIGS. 1 and 2, longitudinal axis 52 extends from a front end 54 to a rear end surface 56 of level body 22, and the threaded channel of insert 36 includes an open end that is accessible through rear end surface 56 such that fastener 34 can be received within the threaded channel through rear end surface 56. In this arrangement, the rotating vial surround 30 and vial 28 are located between end surface 56 and central vial 24.

Referring to FIG. 1, fastener 34 is sized and positioned relative to level body 22 to both provide convenient access to and manipulation of fastener 34, without providing a protrusion that might otherwise cause snags, break easily, etc. Thus, as shown in FIG. 1, screw head 41 of fastener 34 includes a sidewall 58 and an endwall 60. Fastener 34 is sized such that endwall 60 is recessed inward in the direction of longitudinal axis 52 relative to rear end surface 56, thus ensuring, fastener 34 (at least in the locked position) does not extend past or protrude from end surface 56. In addition, sidewall 58 is textured, patterned, embossed, raised, etc. to provide a gripping surface that allows the user to easily spin fastener 34 during locking and unlocking.

Figure 5:
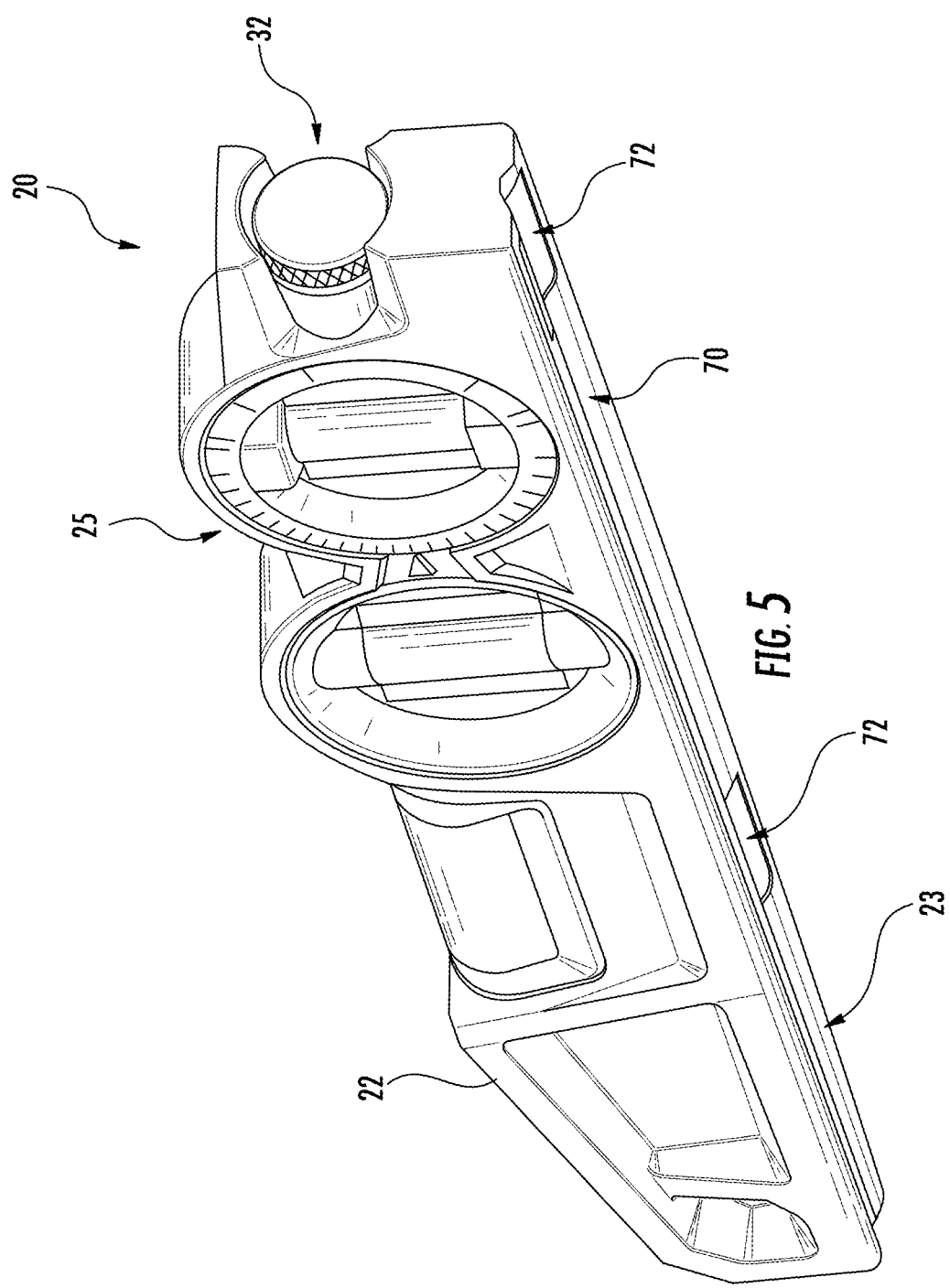
FIG. 5 is a perspective view from below of the level of FIG. 1 according to an exemplary embodiment.

Referring to FIG. 5, a perspective view from below of level 20 is shown. In various embodiments, base 23 may include a groove or channel 70 extending in the direction of longitudinal axis 52 along base 23. In such embodiments, channel 70 allows level 20 to engage an elongate, narrow workpiece, such as conduit. In addition, in some embodiments, level 20 includes one or more magnetic coupling element 72 located along base 23. In such embodiments, the magnetic coupling element(s) 72 facilitate use of level 20 with magnetic workpieces, such as metal conduit, by allowing level 20 to be coupled to the magnetic workpiece via the magnetic attraction provided by magnetic coupling element(s) 72.

Figure 6:
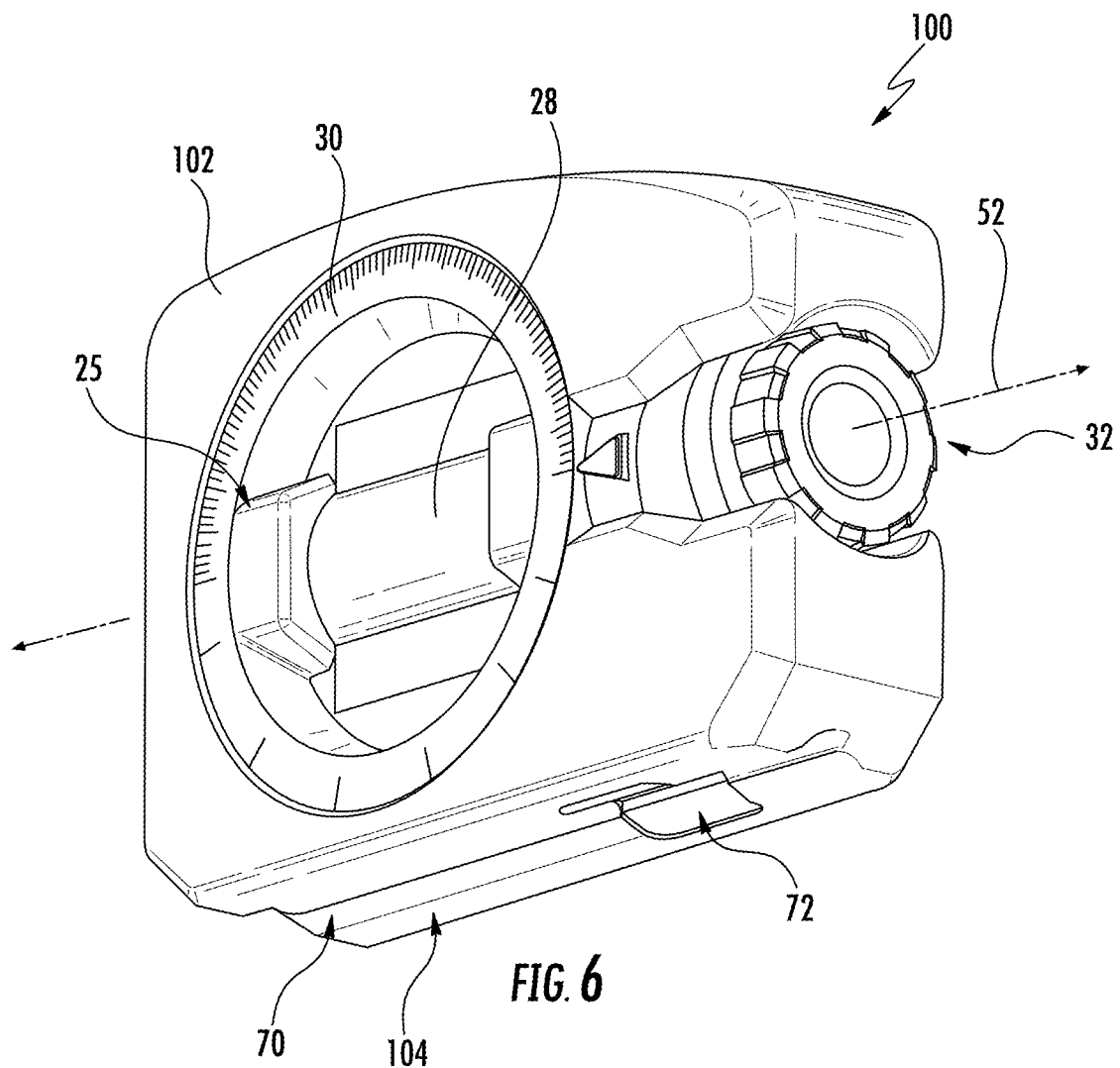
FIG. 6 is a perspective view from below of a level according to another exemplary embodiment.
Figure 7:
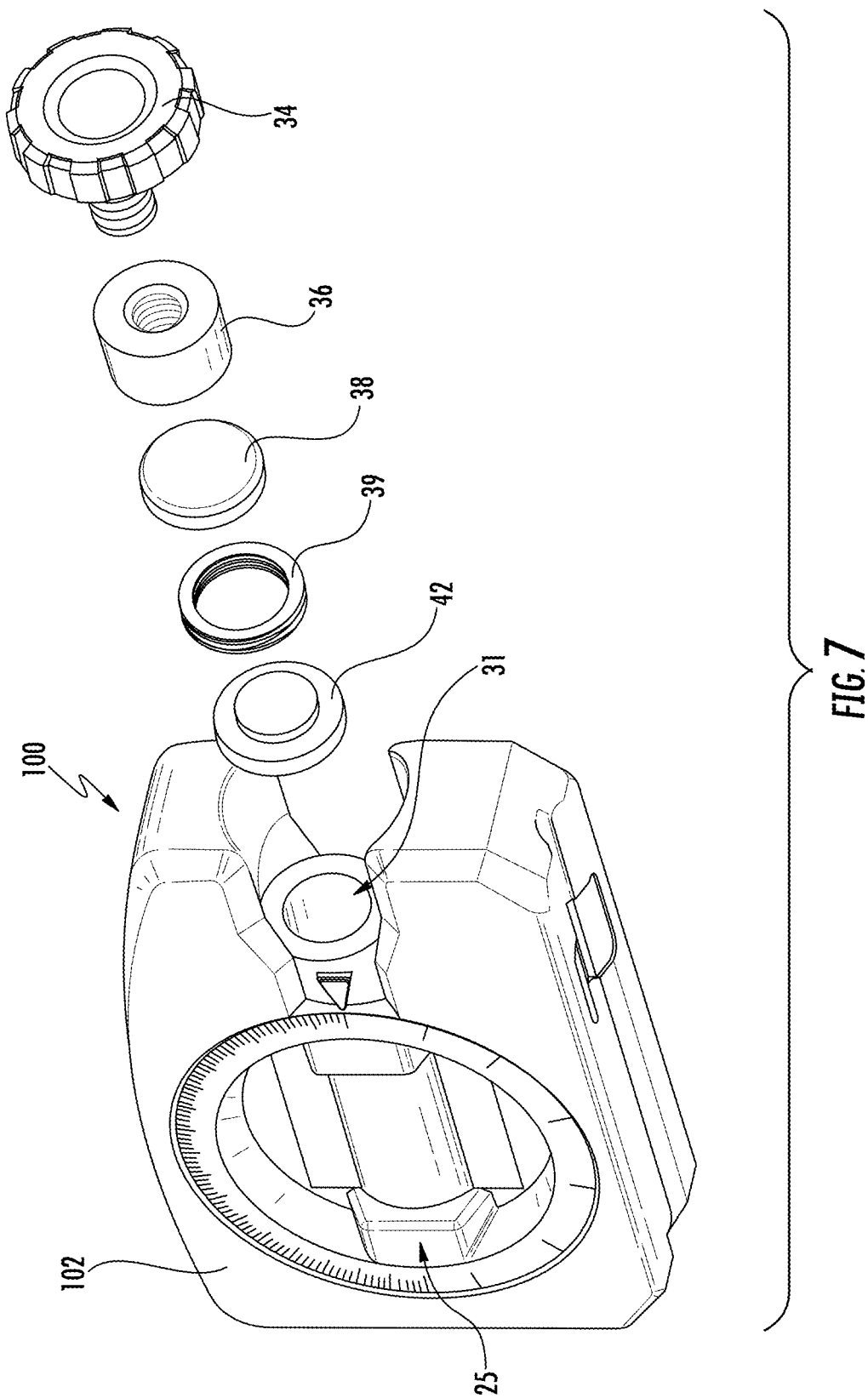
FIG. 7 is an exploded perspective view of a locking assembly of the level shown in FIG. 6 according to an exemplary embodiment.

Referring to FIGS. 6 and 7, a level 100 is shown according to an exemplary embodiment. In general, level 100 is substantially the same as level 20, except that level 100 includes a small level body 102. In various embodiments, level body 102 is sized to fit easily in a pocket, hand, drawer, etc., and level body 102 has a length in the direction of longitudinal axis 52 that is less than the length of level body 22. In such embodiments, level body 102 defines a small, short base 104. In various embodiments, the length of body 102 and of base 104 in the direction of longitudinal axis is less than 12 inches, less than 8 inches, less than 6 inches or less than 4 inches.

As shown, level 100 includes a rotating level vial assembly 25 and a locking system 32. In contrast to level 20, rotating level vial assembly 25, and in particular vial surround 30, is relatively large compared to level body 102. In various embodiments, the maximum outer diameter of vial surround 30 is at least 10% and less than 80% and specifically, at least 25% and less than 75% of the length of body 102.

In various embodiments, locking mechanism 32 may be used with various styles of levels, including block torpedo style level, billet torpedo type level, box levels, I-beam style levels, etc. In various embodiments, level body 22 may be formed from die cast metal such as aluminum, and in other embodiments, level body 22 may be formed from an extruded metal material (e.g., extruded aluminum). In some specific embodiments, base surface 23 is machined to have a flat, flush or planar surface following extrusion, and in some embodiments, this machined surfaced may be anodized.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A level comprising:
    a level body defining a base surface, the level body including:
        a front end surface;
        a rear end surface; and
        a longitudinal axis extending between the front end surface and the rear end surface defining a length of the level body;
    a level vial located within the level body;
    a vial surround supporting the level vial, the vial surround located within an opening formed in the level body, wherein the vial surround includes an outer diameter; and
    a locking system comprising:
        a fastener; and
        an insert having a threaded channel parallel to the longitudinal axis, wherein the threaded channel includes an open end extending through the rear end surface such that the fastener is received within the threaded channel.

2. The level of claim 1, wherein the outer diameter of the vial surround is at least 25% and less than 75% of the length of the level body.

3. The level of claim 2, wherein the length of the level body is less than 12 inches.

4. The level of claim 1, wherein the vial surround has an axis of rotation and is positioned such that the axis of rotation is perpendicular to the longitudinal axis and parallel to a plane defined by the base surface.

5. The level of claim 4, wherein the vial surround is rotatable within the opening 360 degrees in both the clockwise and counterclockwise directions.

6. The level of claim 1, wherein the base surface includes a channel extending in a direction of the longitudinal axis such that the base surface is configured to engage a workpiece.

7. The level of claim 1, wherein the level further includes one or more magnetic coupling components positioned along the base surface.

8. A level comprising:
    a level body defining a base surface;
    a level vial assembly comprising:
        a rotating level vial; and
        a vial surround supporting the rotating level vial, the vial surround located within an opening formed in the level body and wherein the vial surround is freely rotatable within the opening; and
    a locking mechanism, set within a cavity of the level body, comprising:
        an actuator;
        an insert, to receive the actuator;
        a retainer and a pad both located within the cavity behind the insert; and
        a spring element located between the retainer and the pad;
        wherein, when the locking mechanism is in a locked position the spring element is in a compressed state and, when the locking mechanism is in an unlocked position, the spring element is in a uncompressed state
        wherein the pad includes a face in contact with a surface of the vial surround when the spring element is in both the compressed state and in the uncompressed state to provide a constant contact of the pad with the surface of the vial surround;
        wherein the constant contact creates a minimum friction between the surface of the vial surround and the pad.

9. The level of claim 8, wherein the minimum friction prevents the vial surround from freely rotating when the spring element is in the uncompressed state, such that the level vial is set in the unlocked position with respect to the base surface.

10. The level of claim 8, wherein the actuator provides a variable coupling force on the vial surround such that the rotatable level vial may be oriented and selectably fixed at a plurality of angular positions relative to the base surface.

11. The level of claim 8, wherein the rotating level vial is the only rotatable level vial supported by the level body.

12. The level of claim 11, further including:
   a first fixed level vial positioned in the level body such that the first fixed level vial is parallel to the base surface; and
   a second fixed level vial positioned in the level body such that the second fixed level vial is perpendicular to the base surface.

13. The level of claim 12, further including a longitudinal axis extending between a front end and a rear end surface of the level body, wherein the vial surround and rotatable level vial are positioned between the rear end surface and the first fixed level vial.

14. The level of claim 8, wherein an adhesive is used to fix the insert within the cavity of the level body.

15. A level comprising:
   a level body defining a base surface and a longitudinal axis extending between a front end and a rear end surface of the level body;
   a rotating level vial;
   a vial surround supporting the rotating level vial, the vial surround located within an opening formed in the level body, wherein the vial surround is freely rotatable within the opening such that the rotating level vial may be oriented at a plurality of angular positions relative to the base surface; and
   a locking system, set within a cavity of the level body, comprising:
      a fastener providing a variable coupling force on the vial surround;
      an insert, fixed at an entrance of the cavity, to receive the fastener, wherein the insert is substantially parallel to the longitudinal axis;
      a retainer including an outer diameter;
      a pad including an outer diameter; and
      a spring element between the retainer and the pad;
      wherein the outer diameters of the retainer and pad are less than an inner diameter of the cavity such that both the retainer and pad are sized to fit within the cavity behind the insert and moveable in a longitudinal direction within the cavity;
      wherein, when the locking system is in an engaged position the spring element is in a compressed state and, when the locking system is in an disengaged position, the spring element is in a uncompressed state.

16. The level of claim 15, wherein the pad includes a face in contact with a surface of the vial surround when the spring element is in both the compressed state and in the uncompressed state to provide a constant contact of the pad with the surface of the vial surround and wherein the constant contact creates a minimum friction between the surface of the vial surround and the pad regardless of a position of the fastener.

17. The level of claim 15, the retainer including a post extending within the spring element in the longitudinal direction, the post having a reduced diameter relative to the outer diameter of the retainer.

18. The level of claim 15, the pad including a post extending within the spring element in the longitudinal direction, the post having a reduced diameter relative to the outer diameter of the pad.

19. The level of claim 15, wherein the fastener is a threaded screw having a head that includes a sidewall and an endwall, the endwall recessed inward along the longitudinal axis relative to the rear end surface.

20. The level of claim 19, wherein the sidewall includes a gripping surface such that a user can easily spin the fastener to engage and disengage the locking system.

* * * * *